(12) United States Patent
Prendergast

(10) Patent No.: US 6,862,748 B2
(45) Date of Patent: Mar. 8, 2005

(54) MAGNET MODULE FOR NIGHT VISION GOGGLES HELMET MOUNT

(75) Inventor: Jonathon R. Prendergast, Newport Beach, CA (US)

(73) Assignee: Norotos Inc, Santa Ana, CA (US)

( * ) Notice: Subject to any disclaimer, the term of this patent is extended or adjusted under 35 U.S.C. 154(b) by 0 days.

(21) Appl. No.: 10/391,332

(22) Filed: Mar. 17, 2003

(65) Prior Publication Data

US 2004/0181855 A1 Sep. 23, 2004

(51) Int. Cl.[7] .............................. A42B 1/24; F41H 1/04
(52) U.S. Cl. ................................ 2/422; 2/6.2; 335/205
(58) Field of Search .............................. 2/422, 6.2, 6.3, 2/6.7, 6.5; 359/409, 815; 200/60; 335/205, 285

(56) References Cited

U.S. PATENT DOCUMENTS

| | | | |
|---|---|---|---|
| 1,226,101 A | | 5/1917 | Marsden |
| 2,284,180 A | | 5/1942 | Thomas |
| 3,250,871 A | * | 5/1966 | Wigger ..................... 200/61.46 |
| 3,601,729 A | * | 8/1971 | Hierta ........................ 335/205 |
| 4,449,787 A | | 5/1984 | Burbo et al. |
| 4,553,873 A | | 11/1985 | Salice |
| 4,689,834 A | | 9/1987 | McCarthy et al. |
| 4,697,783 A | | 10/1987 | Kastendieck et al. |
| 4,987,608 A | | 1/1991 | Cobb |
| 5,017,748 A | * | 5/1991 | Sapiro ....................... 200/84 C |
| 5,176,342 A | | 1/1993 | Schmidt et al. |
| 5,179,735 A | | 1/1993 | Thomanek |
| 5,209,343 A | * | 5/1993 | Romano et al. ......... 200/61.52 |
| 5,226,181 A | | 7/1993 | Polednak et al. |
| 5,256,839 A | * | 10/1993 | Gallagher ................ 200/61.52 |
| 5,331,684 A | | 7/1994 | Baril et al. |
| 5,339,464 A | | 8/1994 | Dor |
| 5,347,119 A | | 9/1994 | Connors |
| 5,408,086 A | | 4/1995 | Morris et al. |
| 5,467,479 A | | 11/1995 | Mattes |
| 5,469,578 A | | 11/1995 | Mattes |
| 5,471,678 A | | 12/1995 | Dor |
| 5,506,730 A | * | 4/1996 | Morley et al. .................. 2/422 |
| 5,542,627 A | | 8/1996 | Crenshaw et al. |
| 5,581,806 A | | 12/1996 | Capdepuy et al. |
| 5,648,862 A | | 7/1997 | Owen |
| 5,703,354 A | | 12/1997 | Wannagot et al. |
| 5,777,290 A | * | 7/1998 | Tzanev .................... 200/61.52 |
| 5,914,816 A | | 6/1999 | Soto et al. |
| 6,457,179 B1 | | 10/2002 | Prendergast |
| 6,472,776 B1 | | 10/2002 | Soto et al. |

* cited by examiner

Primary Examiner—Rodney M. Lindsey
(74) Attorney, Agent, or Firm—Christie, Parker & Hale, LLP

(57) ABSTRACT

The present invention provides for a magnet module adapted for use in an automatic shutdown assembly of a flip-up helmet mount for a night vision device, the magnet module comprising a vertically angled cavity with a substantially L-shaped profile, the cavity including a use end and a stowed end substantially opposite the use end and a bar magnet slidably received within the cavity and movable between the use end and the stowed end.

26 Claims, 9 Drawing Sheets

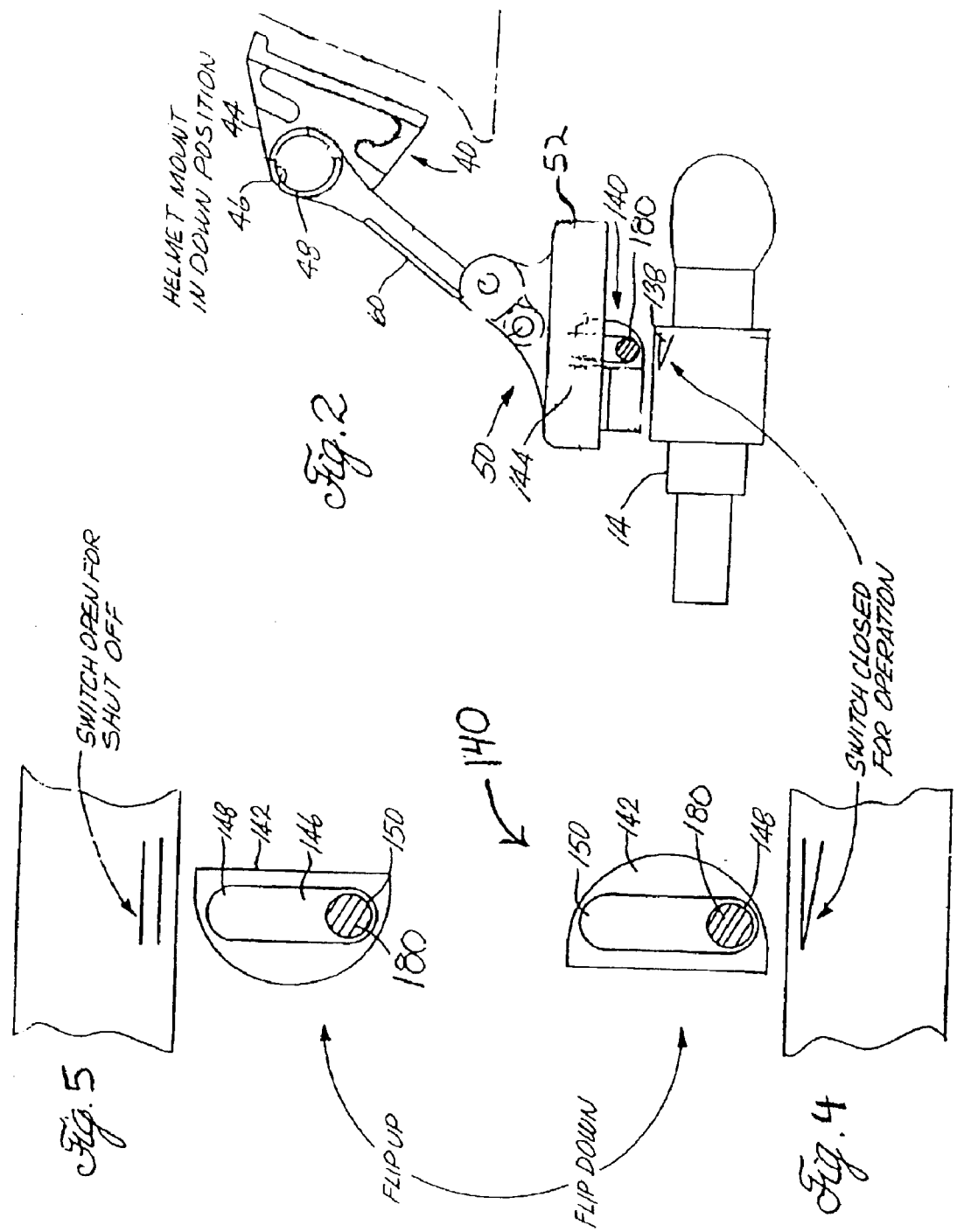

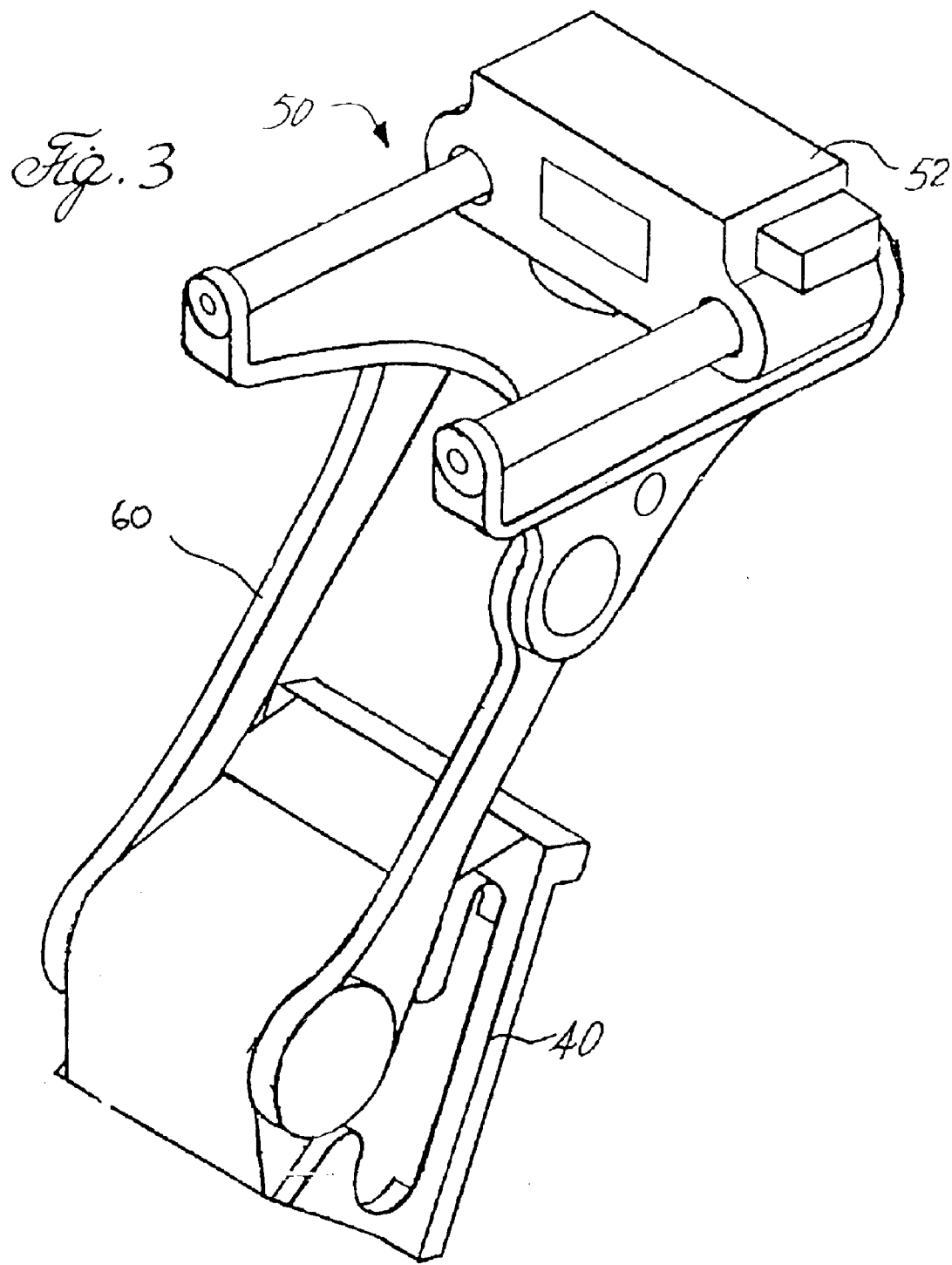

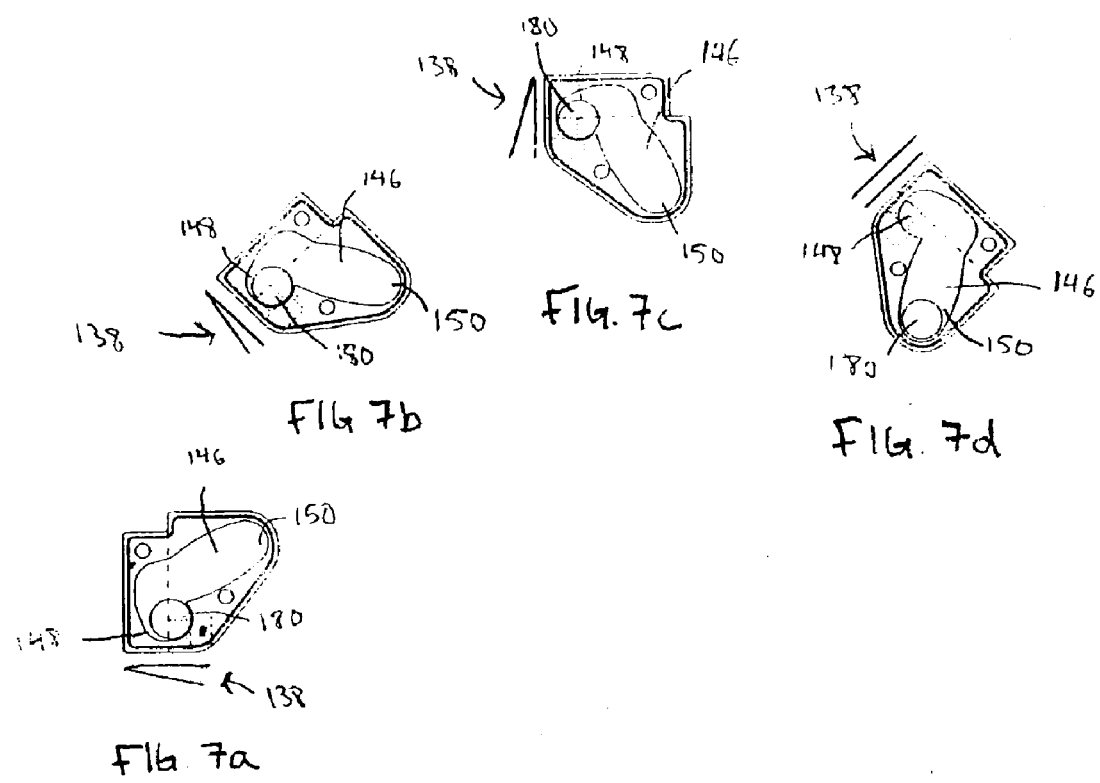

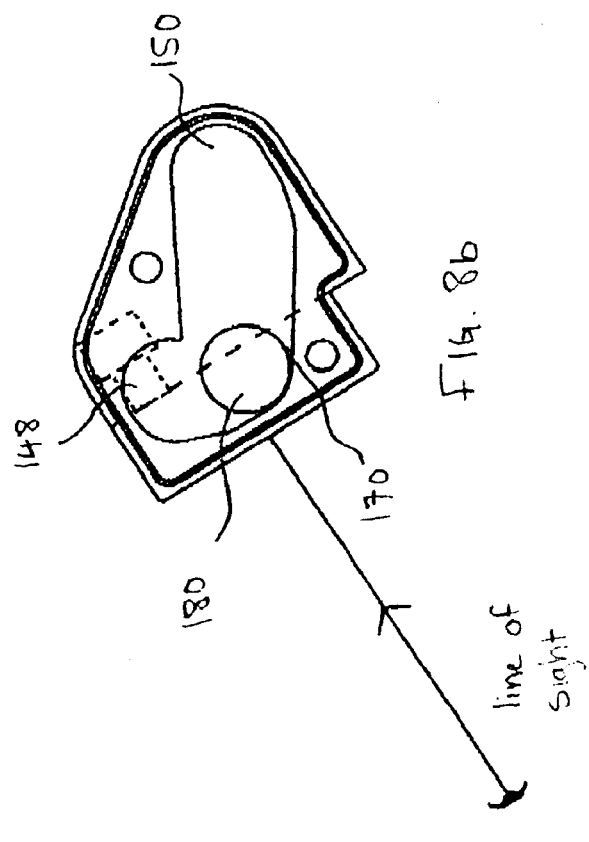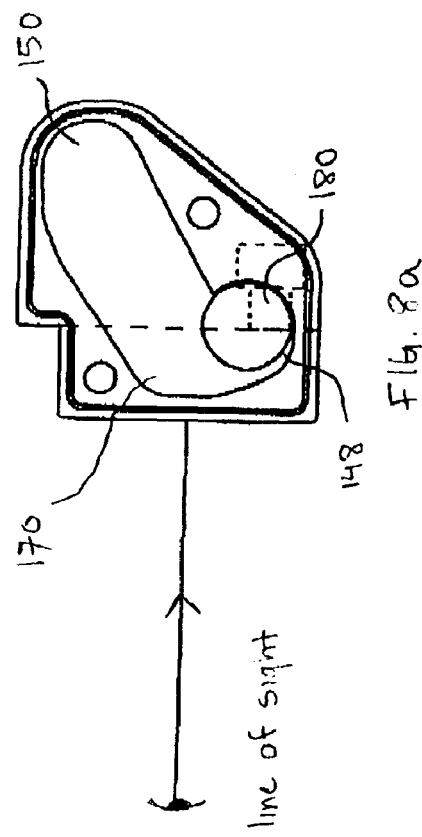

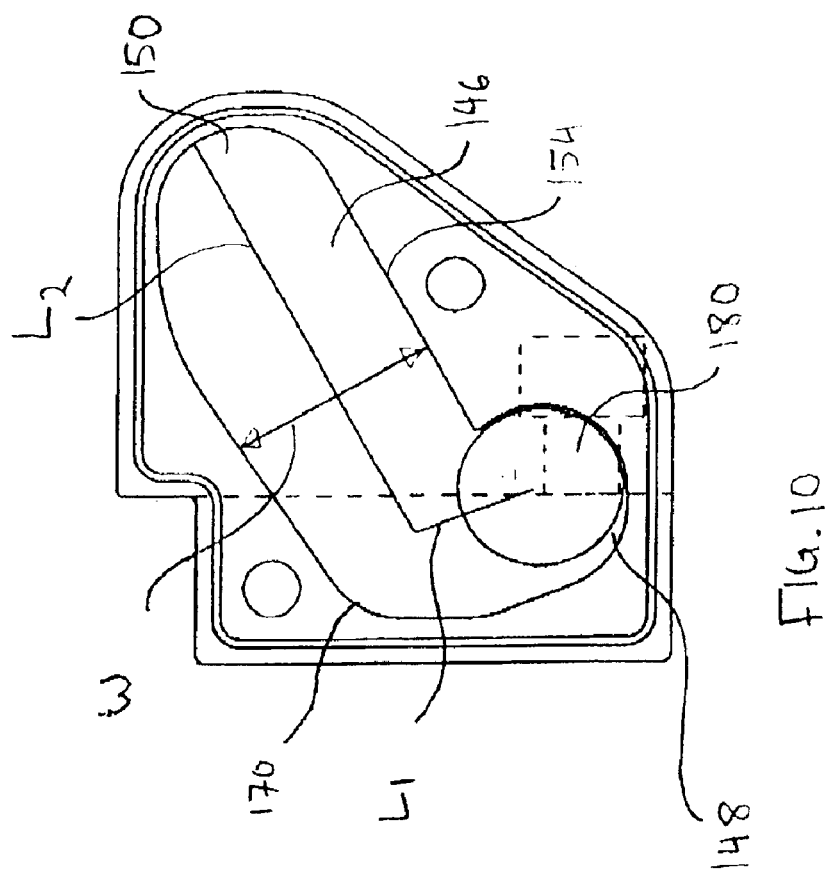
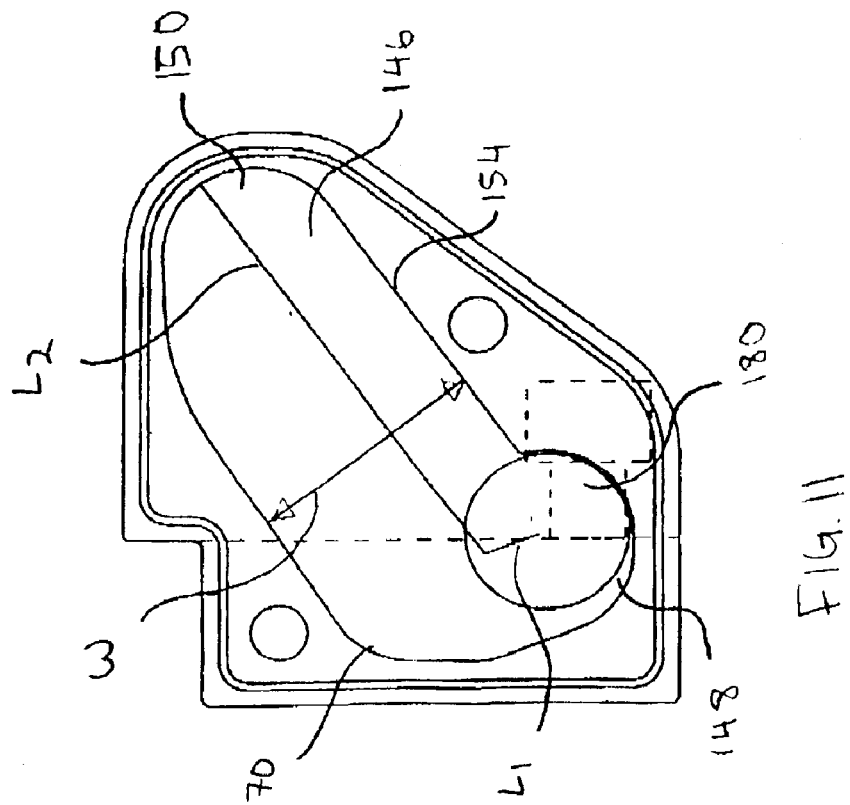

MAGNET MODULE FOR NIGHT VISION GOGGLES HELMET MOUNT

FIELD OF THE INVENTION

This invention relates generally to mounting assemblies for night vision devices, and more particularly, to a magnet module that enables the night vision device to remain in use during various combat maneuvers.

BACKGROUND

Night vision devices are commonly used by military personnel for conducting operations in low light or night conditions. The night vision devices utilized by the military typically include image intensifier tubes and associated optics that convert infrared and near infrared light into viewable images. A common night vision device currently being used in the U.S. Army is the PVS7 night vision device, manufactured by ITT Corporation in Roanoke, Va.

Assemblies for mounting night vision devices to a helmet are well-known in the art. These mounting assemblies allow a user's hands to remain free while viewing a scene through the night vision device. Prior art mounting assemblies typically include one or more of the following features: positional adjustment of the night vision device between a use and stowed position; tilt angle adjustment of the night vision device relative to the user's eyes; focal adjustment of the location of the night vision device relative to the user's eyes; and automatic shutdown of the night vision device when not in the use position.

A known mounting assembly for night vision devices encompasses a flip-up helmet mount that attempts to provide all of the features identified above. However, in that device, the automatic shutdown assembly may be triggered while the user is performing certain combat maneuvers. More particularly, the automatic shutdown assembly includes a magnet module having a vertically extending oval-shaped cavity. A long, narrow bar-shaped magnet is disposed within the cavity and translates from one end of the cavity to an opposite end of the cavity by gravity. The night vision device is turned on when the magnet is at an end of the cavity immediately adjacent to a magnetically responsive switch. The night vision device is automatically turned off when the magnet is moved to an opposite end of the cavity where the magnet is sufficiently displaced from the switch.

It is important that the night vision device turn off when flipped up. The combination of an elongated cavity for movement of long, narrow bar magnet within results in an automatic shutdown assembly with excellent reliability. However, when the operator performs certain combat maneuvers, such as a lateral roll, the bar magnet, under the influence of gravity, can easily move between both ends of the cavity. Thus, the automatic shutdown assembly may intermittently turn the goggles off in use or on while not in use due to inadvertent movement of the magnet caused by movement of a person wearing the goggles. This is undesirable since a user's "night vision" and safety may be affected during a critical moment of combat.

Thus, there is a need for an improved magnet module which operates reliably during movement of the night vision device from use to stowed position but does not inadvertently operate during certain combat maneuvers and which addresses these and other problems that exist with flip-mount helmet mounts for night vision devices disclosed in the prior art.

SUMMARY OF THE INVENTION

The present invention, therefore, provides an improved flip-up helmet mount for night vision devices. More particularly, the flip-up helmet mount according to the present invention is designed to allow for a substantially quiet automatic shut-off night vision device that operates only when intended. In addition, the flip-up helmet mount is designed to allow for one-handed adjustment of the position, tilt, and focus of the night vision device.

The present invention provides for a magnet module adapted for use in an automatic shutdown assembly of a flip-up helmet mount for a night vision device, the magnet module comprising a vertically angled cavity with a substantially L-shaped profile, the cavity including a use end and a stowed end substantially opposite the use end and a bar magnet slidably received within the cavity and movable between the use end and the stowed end.

BRIEF DESCRIPTION OF THE DRAWINGS

These and other features and advantages of the present invention will be appreciated as they become better understood by reference to the following Detailed Description when considered in connection with the accompanying drawings, wherein:

FIG. 2 is a side elevation view of the flip-up helmet of FIG. 1, removed from the helmet;

FIG. 3 is a perspective view of the flip-up helmet mount of FIG. 1 in a stowed position.

FIG. 4 is a partial cross-sectional schematic view of the automatic shutdown assembly, with the night vision device in the use position;

FIG. 5 is a partial cross-sectional schematic view of the automatic shutdown assembly, with the night vision device in the stowed position;

FIGS. 7a–7d are partial side views showing the operation of the magnetic module from the use position to the stowed position;

FIGS. 8a–8b are partial side views showing the operation of the magnetic module during a lateral roll.

FIG. 10 is a partial side view of the magnet module with the night vision device in the use position.

FIG. 11 is a partial side view of an alternate embodiment of the magnet module with the night vision device in the use position.

DETAILED DESCRIPTION

Figure 1:
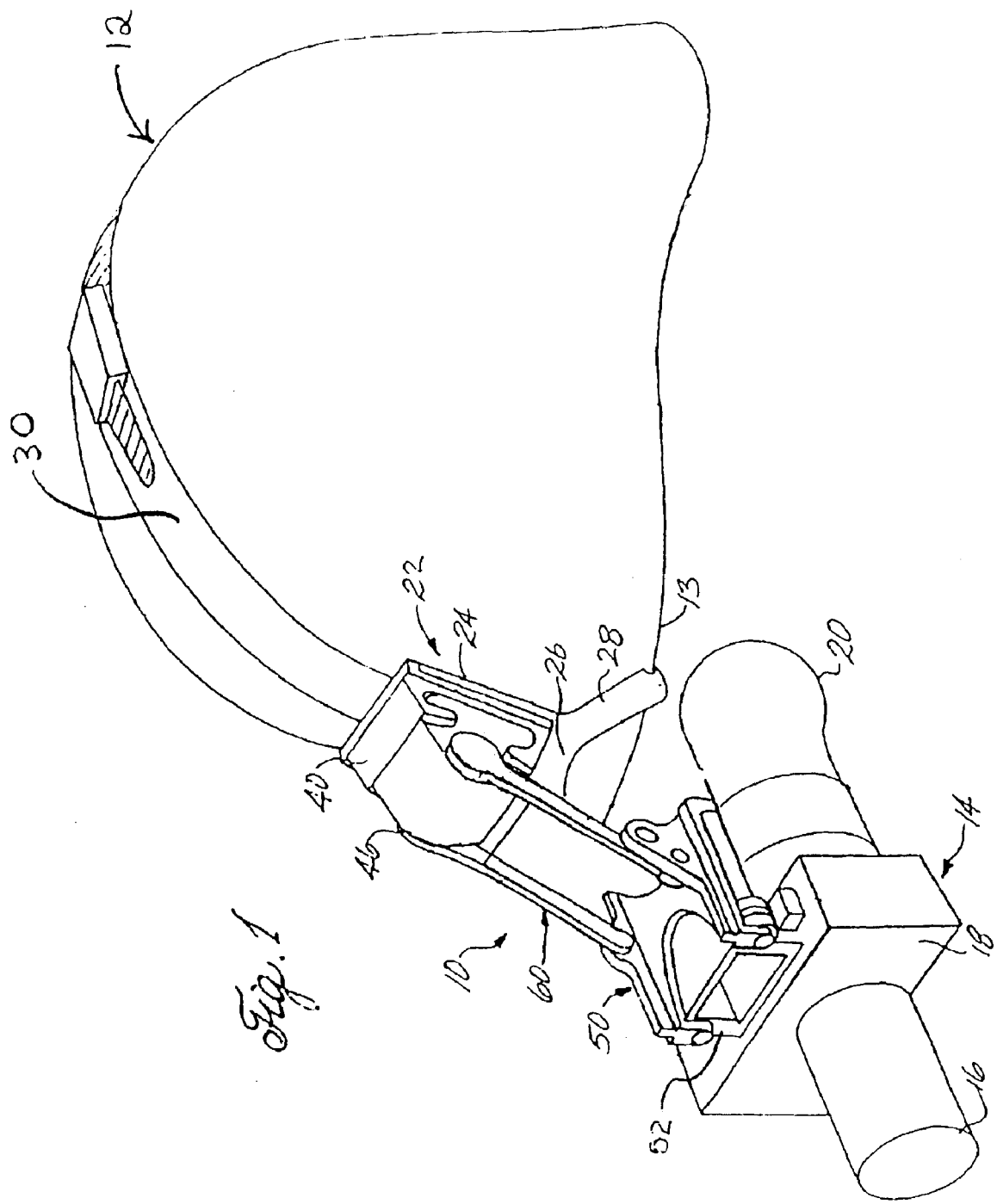
FIG. 1 is a perspective view of the flip-up helmet mount provided for in the present invention secured to a helmet, wherein the night vision device is in a use position.

FIG. 1 depicts a flip-up helmet mount 10 used in combination with an exemplary embodiment of a magnet module according to the present invention. A description of such a flip-up helmet mount is described in U.S. Pat. No. 6,472,776, the disclosure of which is incorporated herein by reference. The flip-up helmet mount 10 is shown in use with a standard U.S. Army Kevlar composite helmet 12. A night vision device 14 is secured to the helmet 12 by use of the flip-up helmet mount 10. The night vision device 14 shown in FIG. 1 is a device that includes a single objective lens 16, a housing 18, and a pair of eye pieces 20. To use the night vision device, the operator places it in the position depicted in FIG. 1 and looks into the eye pieces 20 to see an enhanced image representative of the low-level light from a night scene which has entered the objective lens. It should be understood that the present invention may be used with other types of flip-up mounts, other types of night vision devices and other types of helmets or other head gear. For ease of description, the magnet module is shown in use with a particular helmet mount.

The flip-up helmet mount 10 may be secured to the helmet in any of a variety of ways, including those well-known in the art. FIG. 1 shows the flip-up helmet mount secured to the helmet by means of a quick-release mechanism assembly 22. The quick-release mechanism assembly includes a brace plate 24 having a broad based hook member 26. The hook member 26 includes a pair of laterally spaced hook portions 28, which engage under a brim 13 of the helmet. The quick-release mechanism may be secured to the helmet by a strap 30 that includes ratchet means for adjusting the strap relative to the helmet to ensure a snug fit on various sizes of helmets. Alternatively, fasteners may be used to secure the quick-release mechanism assembly directly to the helmet.

The flip-up helmet mount 10 includes a helmet block 40, which is releasably secured to the quick-release mechanism assembly. A rear surface of the helmet block engages the brace plate 24 of the quick-release mechanism assembly when the flip-up helmet mount is secured to the helmet. As can be seen in FIG. 1, a front surface 44 of the helmet block 40 (see FIG. 2) defines a transverse boss 46 having a transverse bore 48 therein. The night vision device is rotationally coupled with the helmet block to allow the user to pivot the night vision device between a use and a stowed position.

The flip-up helmet mount 10 also includes a chassis 50 slidably coupled with a socket assembly 52. The night vision device 14 is coupled with socket assembly 52. The socket assembly 52 is slidably adjustable relative to the chassis 50 to allow focal adjustment of the night vision device 14. The chassis 50 is also coupled with the helmet block by an upright, or bracket member 60. The chassis 50 is rotationally coupled with the bracket member 60 at a proximal end of the bracket member 60 to allow for tilt angle adjustment of the night vision device 14.

Automatic Shut Down Assembly

The flip-up helmet mount 10 enables an operator to adjust the night vision device 14 between a use or operation position, shown in FIG. 1, and a non-use or stowed position, shown in FIG. 3. The flip-up helmet mount automatically shuts down the night vision device 14 when in the stowed position. More particularly, the flip-up helmet mount provides for reliable, substantially quiet and essentially jam-proof automatic shutdown of the night vision device 14.

The night vision device 14 includes a power supply in the form of a battery pack (not shown) internal to housing 18. A power supply circuit provides power to an image intensifier tube (not shown), which supplies to eye pieces 20 an intensified image in phosphor yellow/green light of the scene viewed by objective lens 16. The power supply circuit also includes a magnetically-responsive switch, schematically indicated as 138 in FIG. 2. The switch 138 maintains electrical power supply to the night vision device 14 once it is turned on by the user only so long as a magnetic field of sufficient strength is supplied to switch 138. An automatic shutdown assembly is essential when using a flip-up helmet mount 10, because if the user forgets to turn off the night vision device 14 before moving it to the stowed position, the phosphor yellow/green light emitted from eye pieces 20 may be visible to possibly hostile personnel in front of the user. The phosphor yellow/green light would appear as a pair of small spot lights and may be visible at great distances at night, indicating the user's position to those in front of the user.

Accordingly, the flip-up helmet mount 10 includes an automatic shutdown assembly 140 to provide the necessary magnetic flux to switch 138 when the night vision device is in the use position, while at the same time insuring that the magnetic field is removed from the switch 138, thus eliminating the phosphor yellow/green light, when the night vision device 14 is pivoted to the stowed position. The automatic shutdown assembly 140 includes a magnet module 142 in socket assembly 52. The magnet module 142 is located at a rear section 144 of the socket assembly, immediately above magnetically responsive switch 138 of the night vision device. The module 142 has a vertically angled cavity 146, as shown schematically in FIG. 6, that is generally oval-shaped and includes a rounded top or "use" end 148 adjacent to switch 138, and a rounded bottom or "stowed" end 150 substantially opposite switch 138.

Figure 6:
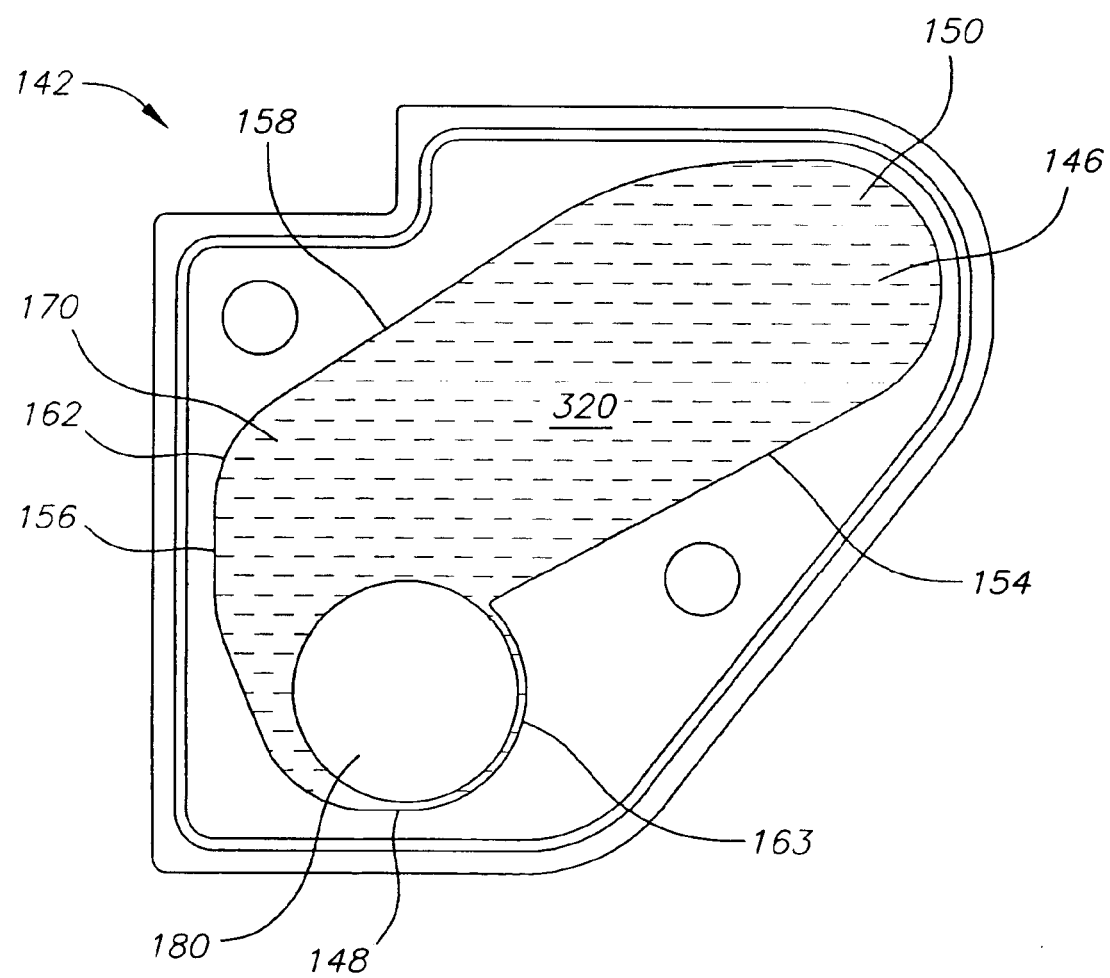
FIG. 6 is a partial side view of the magnetic module, with the night vision device in the use position.

As shown in FIG. 6, a rear chamber 170 is formed by side wall 156, corner 162 and a second angled wall 158. Rear chamber 170 is adapted to receive a bar magnet that is slidably disposed within the vertically angled cavity 146. When magnet 180 rests in rear chamber 170, magnet 180 will be sufficiently close to magnetic switch 138 to allow the goggles to remain on.

Slidably received within the cavity 146 is a cylindrical bar magnet member 180. The bar magnet 180 provides sufficient magnetic flux to switch 138 to keep the night vision device turned on so long as magnet 180 is in, or immediately adjacent to, the use end 148 of cavity. As can be seen from FIG. 4, the magnet is in the use end 148 when the night vision device 14 is in the use position. The magnet is kept in this location by gravity and by retaining surface 163. However, when the user flips-up the night vision device 14 into the stowed position, gravity acts on the bar magnet 180 to move the magnet 180 away from use end 148 of the cavity toward stowed end 150 of the cavity. As shown in FIG. 5, the bar magnet 180 is sufficiently far from the magnetically responsive switch 138 when it is in the stowed end 150 of the cavity so that the night vision device 14 is automatically turned off. In previous magnet modules having a substantially oval shaped profile, the magnet would move from the use end to the stowed end after a rotation of just over 90° in either direction. In an exemplary embodiment shown in FIG. 6, the magnet module 142 in the orientation shown would have to be rotated clockwise 135° for the magnet 180 to travel from the use end 148 to the stowed end 150. In the same embodiment and starting in the same orientation, the magnet module would have to be rotated counterclockwise 170° for the magnet 180 to travel from the use end 148 to the stowed end 150. Due to the ability of the tilt adjustment mechanism to tilt the helmet mount about 10° in either direction (clockwise or counterclockwise), the actual angle required to transport the magnet 180 from the use end 148 to the stowed end 150 may vary by about 10°.

Referring now to FIG. 10, L1 represents the minimum travel distance of the center of the magnet 180 as the magnet 180 moves from the use end 148 toward the rear chamber 170 as the magnet module 142 is shifted from a use position to a stowed position (as illustrated in FIGS. 7a–7d). L2, on the other hand, represents the minimum travel distance of the center of the magnet 180 as the magnet moves along wall 154 toward the stowed end 150 as the magnet module 142 is shifted from a use position to a stowed position. In the preferred embodiment shown in FIG. 10, the ratio of L2 to L1 is about 3.8. In this embodiment, the magnet module 142 would have to be rotated clockwise about 135° for the magnet 180 to travel from the use end 148 to the stowed end 150. In the same embodiment and starting in the same orientation, the magnet module would have to be rotated counterclockwise about 170° for the magnet 180 to travel from the use end 148 to the stowed end 150. As noted above, in previous magnet modules having a substantially oval shaped profile, the magnet would move from the use end to the stowed end after a rotation of just over 90° in either direction.

FIG. 11 shows an alternate embodiment of the present invention, where L1 and L2 represent the same minimum travel distances of the magnet 180 as in FIG. 10. However, in FIG. 11, the ratio of L2 to L1 is about 8.4. In this embodiment, the magnet module 142 would have to be rotated clockwise about 100° for the magnet 180 to travel from the use end 148 to the stowed end 150. In the same embodiment and starting in the same orientation, the magnet module would have to be rotated counterclockwise about 155° for the magnet 180 to travel from the use end 148 to the stowed end 150. While the embodiment shown in FIG. 11 does not have as great a range as the preferred embodiment shown in FIG. 10, the range is still greater than the range of previous magnet modules. Thus it would be obvious to one skilled in the art that in order to achieve a greater range of motion than previous magnet modules, the ratio of L2 to L1 may be from about 3.8 to about 8.4.

Figure 12:
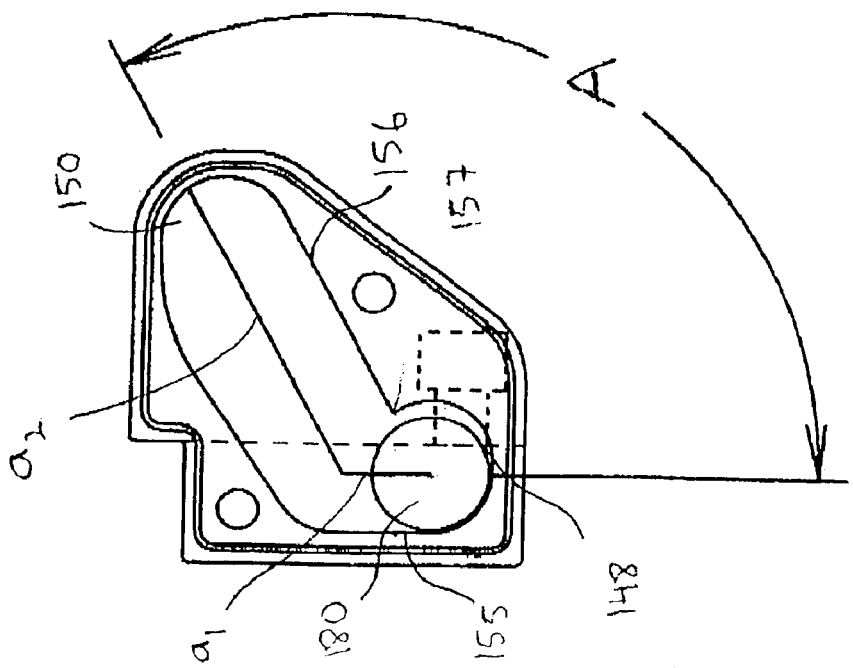
FIG. 12 is a partial side view of an alternate embodiment of the magnet module with the night vision device in the use position.

FIG. 12 shows an alternate embodiment of the present invention wherein rear wall 155 is substantially vertical. Further, as shown in FIG. 12, the distance between rear wall 155 and clearance point 157 (as defined by the intersection of retaining surface 163 and wall 154) is slightly larger than the diameter of the magnet 180. In this embodiment, the angle A formed by the direction the magnet 180 must move adjacent to the rear wall 155 in order to bypass the clearance point 157 (a1) and the direction the magnet must move along wall 156 (a2) as the magnet is rotated clockwise is about 120°. In this embodiment, the magnet module 142 would have to be rotated clockwise about 120° for the magnet 180 to travel from the use end 148 to the stowed end 150. In the same embodiment and starting in the same orientation, the magnet module would have to be rotated counterclockwise about 170° for the magnet 180 to travel from the use end 148 to the stowed end 150.

Figure 13:
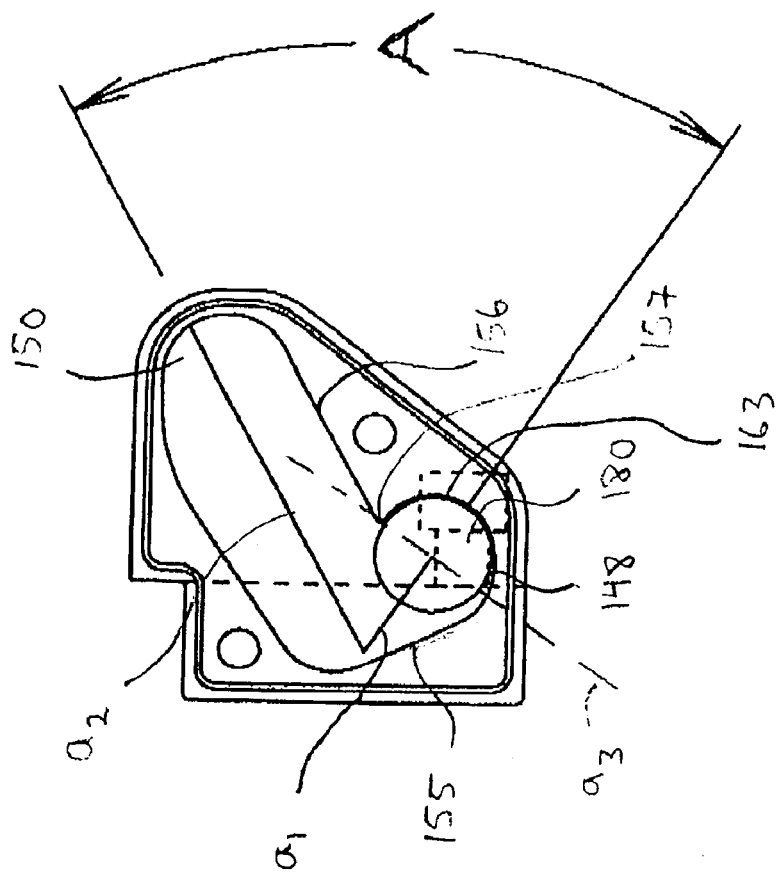
FIG. 13 is a partial side view of an alternate embodiment of the magnet module with the night vision device in the use position.

FIG. 13 shows another alternate embodiment of the present invention. As shown in FIG. 13, a3 represents the diameter of the magnet 180 tangent to clearance point 157. The angle A formed by the line a1 perpendicular to a3 and the direction the magnet 180 must move along wall 156 as the magnet is rotated clockwise is about 60°. In this embodiment, the magnet module 142 would have to be rotated clockwise about 147° for the magnet 180 to travel from the use end 148 to the stowed end 150. In the same embodiment and starting in the same orientation, the magnet module would have to be rotated counterclockwise about 170° for the magnet 180 to travel from the use end 148 to the stowed end 150.

FIGS. 12 and 13 serve to illustrate various arrangements and dimensions of the substantially L-shaped cavity 146. It will be obvious to one skilled in the art that the illustrated embodiments show only certain embodiments of the present invention. More particularly, cavity 146 may vary in actual shape while still remaining within the scope of the claims of the present invention.

Figure 9:
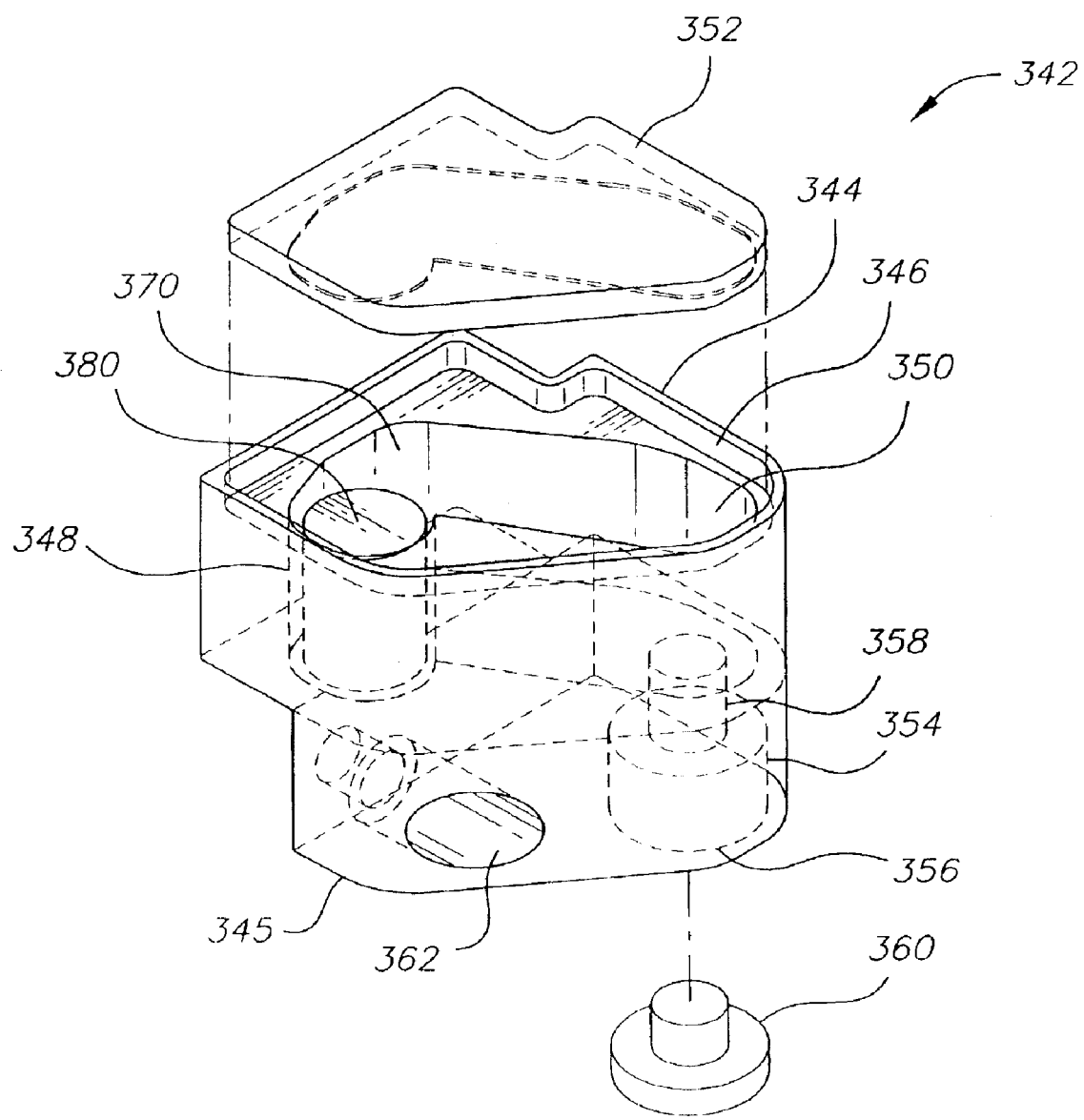
FIG. 9 is an exploded view of the magnetic module, with the night vision device in the use position.

In a preferred embodiment shown in FIG. 9, a magnet module assembly 342 under construction has a body 344 containing a cavity 346 and a base 345. The cavity 346 is substantially L-shaped with each end 348, 350 of the cavity being rounded.

Through the open top surface of the magnet module assembly 342 a magnet 380 is inserted into the cavity 346. The magnet 380 is generally cylindrical and has a generally square shaped cross-section when cut lengthwise. Once the magnet 380 has been inserted into the cavity 346, a lid 352 having a corresponding cavity shape is bonded onto the body 344 with the use of a two-part epoxy. The lid 352 may also be ultrasonically welded to the body 344.

As shown in an exemplary embodiment in FIG. 9, base may have a hole 362 which serves to attach the magnet module assembly 342 to socket assembly. As further shown in FIG. 9 in an exemplary embodiment, base 345 has a cylindrical channel 354. In a further embodiment, channel 354 may have a first section 356 having a specified radius and a second section 358 having a specified radius which is less than that of the first section 356. A damping fluid 320 (FIG. 6) may be introduced into cavity 346 through channel 354 by using a syringe or other appropriate means of inserting the fluid. When the cavity 346 is filled with the damping fluid 320, a plug 360 that corresponds in shape to the first and second sections 356, 358 of the channel 354 may be inserted into the channel 354. Once the plug 360 is in place, it may be sealed to the base 345 with an adhesive.

In an alternate embodiment, ferrous keepers may be inserted into the use end 348 of the cavity 346. Ferrous keepers may assist in keeping magnet 380 in the use end 348 even when the magnet module is subject to heavy vibration or jolting.

The damping fluid 320 (FIG. 6) is placed in cavity 346 around and over the magnet to dampen the movement of the magnet and to eliminate noise from the magnet contacting the magnet module assembly. Further, when the user of the night vision device is in motion, the damping fluid 320 substantially maintains the magnet in the use or stowed position. Thus, in order to turn the night vision device light on and off, there is required a deliberate rotational motion between positions, as shown in FIGS. 7a–7d.

FIGS. 7a–7d disclose cut away top views of the magnet module assembly 342 with the magnet placed in cavity 346 to assist in showing its relative position in the cavity. Similar to the embodiment schematically shown in FIGS. 4, 5 and 8a–8b, the magnet is movable from a first position in the use end 348 and a second position in the rear chamber 370 that operate the night vision device to a third position in an opposite cavity end 350 that shuts off the night vision device operation.

In a preferred embodiment, damping fluid 320 is a viscous liquid which is free from suspended matter and sediment. The fluid has a viscosity in the range of 5 cs to 15 cs, and a specific gravity at 77.degree. F. in the range of 0.85 to 0.95. The viscosity of the damping liquid is preferably stable over the temperature range of –60.degree. F. to 158.degree. F. The damping fluid is preferably inert and has low air entrapment. These features are preferred so that the damping effect of the fluid remains relatively the same over time with use and during use in different surrounding environments.

Preferably, the fluid is a dimethyl silicone fluid. More preferably, the damping fluid is a polymethylsiloxane polymer manufactured to yield essentially linear polymers with an average kinematic viscosity of about 10 cs. A preferred damping fluid may be obtained from Dow Corning, Midland, Mich., product no. 200 Fluid, 10 cs.

One of the advantages of the automatic shutdown assembly 140 provided in the flip-up helmet mount is that it is more reliable than the assemblies provided in the prior art. The reliability of the shutdown assembly is due in part to the substantially L-shaped cavity and the dimensions of the bar magnet, specifically the length-to-diameter ratio of the magnet. In a presently preferred embodiment, the magnet is an about ¼ inch long, about ¼ inch diameter cylindrical bar. Preferably, the length to diameter ratio of the bar magnet is about 1:1.

Operation

In use of the flip-up helmet mount 10, the operator first secures the quick-release mechanism assembly 22 to the helmet 12 and then secures the flip-up mount 10 to the quick-release mechanism assembly 22. Once the flip-up mount 10 is secured to the helmet 12, the night vision device 14 may be secured to the socket assembly 52 and adjusted into its use position seen in FIG. 1. In this orientation, the bar magnet member 180 is positioned such that the night vision device 14 remains on once the operator switches it on. Moreover, the operator is able to adjust the goggle, allowing the operator to optimize its viewing conditions. When the operator flips the goggle up to its stowed position, the goggle is automatically turned off, as explained above.

The magnet mount 10 of the present invention is particularly useful in preventing the night vision device 14 from inadvertently flipping to its stowed position as shown in FIG. 3 when the operator performs certain combat maneuvers, such as a lateral roll. As shown in FIG. 6, in the normal use or "flipped down" position, gravitational forces retain the magnet 180 within the use end 148 of the cavity 146, immediately adjacent to the magnetically responsive switch 138.

As shown in FIGS. 7a–7d, when the night vision device 14 is flipped up to the stowed position, the magnet module 142 may be rotated clockwise. As the magnet module 142 is rotated clockwise, gravity acts on the magnet 180 to move it away from the use end 148 of the cavity and towards the stowed end 150 of the cavity. At the stowed end 150, the magnet 180 is sufficiently far from the magnetically responsive switch 138 that the night vision device 14 is automatically turned off.

While wearing the helmet mount, a user may perform a lateral roll. For purposes of this invention, a "lateral roll" is defined as a roll whereby a user lying on his stomach in a prone position rolls about the longitudinal axis of the user's body. During a lateral roll starting from the prone position with the user's line of sight facing substantially forward as indicated in FIG. 8a, the user may roll 180° onto his back and tilt his head forward so as to have a line of sight, for example, as indicated in FIG. 8b. The user may then roll another 180° back onto his stomach and return to the position indicated in FIG. 8a. During a lateral roll, as shown in FIGS. 8a–8b, the magnet module 142 may be rotated along its longitudinal axis. As shown in FIG. 8a, the magnet 180 is in the use end 148 of the module 142. As the magnet module 142 is rotated, for example, by 180° as illustrated in FIG. 8b, gravity cooperates with the retaining surface 163 (see FIG. 6) to retain the magnet 180 within the rear chamber 170 of the cavity. As the magnet module is rotated another 180°, the magnet 180 returns to its position as shown in FIG. 8a. Thus, the night vision device remains turned on during the entire lateral roll, moving only between the use end 148 and the rear chamber 170, allowing users to retain their "night vision" while performing various combat maneuvers.

While preferred embodiments of the present invention describe clockwise rotation of the magnet module when the night vision device is flipped to the stowed position, it would be obvious to one skilled in the art that the magnet module may be configured to rotate in a clockwise orientation when flipping the night vision device to its stowed position.

It should also be noted that in a presently preferred embodiment, a number of the components of the flip-up helmet mount are made from aluminum. Prior art helmet mounts were generally made from plastic. The novel design of the flip-up helmet mount of the present invention permits the use of aluminum for a number of components, providing added strength and stability to the structure, while not increasing the overall weight of the flip-up helmet mount when compared to the plastic versions disclosed in the prior art. Specifically, in the presently preferred embodiment where only the helmet block and the magnet module remain plastic, the flip-up helmet mount is approximately 10% lighter than most of the prior art plastic flip-up mounts.

While various embodiments of this invention have been shown and described, it would be apparent to those skilled in the art that many more modifications are possible without departing from the inventive concept herein. It is, therefore, to be understood that within the scope of the appended claims, this invention may be practiced otherwise than as specifically described.

What is claimed is:

1. A magnet module adapted for use in an automatic shutdown assembly of a flip-up helmet mount for a night vision device, the magnet module comprising:
    a vertically angled cavity limited to a substantially L-shaped profile, the cavity including a use end and a stowed end substantially opposite the use end; and
    a bar magnet slidably received within the cavity and movable between the use end and the stowed end.

2. The magnet module of claim 1 wherein the cavity contains a rear chamber formed adjacent to the use end of the cavity, the rear chamber being adapted to receive the bar magnet.

3. The magnet module of claim 2, wherein a magnetically-responsive switching device on the night vision device is positioned immediately adjacent the use end of the cavity, the magnetically-responsive switching device maintaining the night vision device switched on when under the influence of a sufficient magnetic field, and effecting shutdown of the night vision device when the magnetically-responsive switching device is no longer under the influence of the sufficient magnetic field.

4. The magnet module of claim 3, wherein as the night vision device is rotated between a use position and a stowed position, the magnet module is rotated in a first direction, the magnet moves between the use end of the cavity, where the magnet provides the sufficient magnetic field required to keep the night vision device on, and the stowed end of the cavity, where the magnet does not provide the sufficient magnetic field to the magnetically-responsive switching device.

5. The magnet module of claim 4, wherein as the magnet module is rotated in a direction opposite the first direction, such as when an operator of the night vision device performs a lateral or sidewards roll, the magnet moves between the use end of the cavity and the rear chamber, and a retaining surface cooperates with gravity to retain the magnet in close proximity to the magnetically-responsive switching device to provide the sufficient magnetic field required to keep the night vision device on.

6. The magnet module of claim 1, wherein a damping fluid is enclosed with the magnet in the cavity to dampen the movement of the magnet from one of the use and stowed positions to the other of the positions so as to substantially eliminate noise associated with contact of the magnet against the magnet module.

7. The magnet module of claim 2 wherein the ratio of the minimum distance the magnet must travel from the rear chamber to the stowed end to the minimum distance the magnet must move from the use end to the rear chamber is from about 8.4 to about 3.7.

8. The magnet module of claim 7 wherein the ratio of the minimum distance the magnet must travel from the rear chamber to the stowed end to the minimum distance the magnet must move from the use end to the rear chamber is from about 3.9.

9. The magnet module of claim 1, the cavity further comprising a rear wall and a side wall.

10. The magnet module of claim 9 wherein the angle formed by the rear wall and by the side wall is less than about 120°.

11. The magnet module of claim 9 wherein the angle formed by the rear wall and by the side wall is about 90°.

12. An automatic shutdown assembly adapted for use in a flip-up helmet mount for a night vision device, the automatic shutdown assembly comprising:

a magnetically-responsive switching device coupled to the night vision device;

a magnet module adjacent and adapted to influence the switching device, the magnet module having a vertically angled cavity limited to a substantially L-shaped profile, the cavity including a use end and a stowed end substantially opposite the use end, and a bar magnet slidably received within the cavity and movable between the use end and the stowed end.

13. The automatic shutdown assembly of claim 12 wherein the cavity contains a rear chamber formed adjacent to the use end of the cavity, the rear chamber being adapted to receive the bar magnet.

14. The automatic shutdown assembly of claim 13, wherein a magnetically-responsive switching device on the night vision device is positioned immediately adjacent the use end of the cavity, the magnetically-responsive switching device maintaining the night vision device switched on when under the influence of a sufficient magnetic field, and effecting shutdown of the night vision device when the switch is no longer under the influence of the sufficient magnetic field.

15. The automatic shutdown assembly of claim 14, wherein as the night vision device is rotated between a use position and a stowed position, the magnet module is rotated in a first direction, a cam is pivoted from a first position to a second position, and the magnet moves between the use end of the cavity, where the magnet provides the sufficient magnetic field required to keep the night vision device on, and the stowed end of the cavity, where the magnet does not provide the sufficient magnetic field to the switch.

16. The automatic shutdown assembly of claim 15, wherein as the magnet module is rotated in a direction opposite the first direction, such as when an operator of the night vision device performs a lateral or sidewards roll, the magnet moves between the use end of the cavity and the rear chamber, and a retaining surface cooperates with gravity to retain the magnet in close proximity to the magnetically-responsive switching device to provide the sufficient magnetic field required to keep the night vision device on.

17. The automatic shutdown assembly of claim 12, wherein a damping fluid is enclosed with the magnet in the cavity to dampen the movement of the magnet from one of the use and stowed positions to the other of the positions so as to substantially eliminate noise associated with contact of the magnet against the magnet module.

18. A flip-up helmet mount for a night vision device comprising an automatic shut down assembly adapted to influence a magnetically-responsive switching device on the night vision device, the magnetically-responsive switching device maintaining the night vision device switched on when under the influence of a sufficient magnetic field, and effecting shutdown of the night vision device when the switch is not longer under the influence of the sufficient magnetic field, the automatic shutdown assembly comprising magnet module adjacent the magnetically-responsive switch, the magnet module having a vertically angled cavity limited to a substantially L-shaped profile, the cavity including a use end and a stowed end substantially opposite the use end, and a bar magnet slidably received within the cavity and movable between the use end and the stowed end.

19. The flip-up helmet mount of claim 18, wherein the cavity contains a rear chamber formed adjacent to the use end of the cavity, the rear chamber being adapted to receive the bar magnet.

20. The flip-up helmet mount of claim 19, wherein a magnetically-responsive switching device on the night vision device is positioned immediately adjacent the use end of the cavity, the magnetically-responsive switching device maintaining the night vision device switched on when under the influence of a sufficient magnetic field, and effecting shutdown of the night vision device when the switch is no longer under the influence of the sufficient magnetic field.

21. The flip-up helmet mount of claim 20, wherein as the night vision device is rotated between a use position and a stowed position, the magnet module is rotated in a first direction, the magnet moves between the use end of the cavity, where the magnet provides the sufficient magnetic field required to keep the night vision device on, and the stowed end of the cavity, where the magnet does not provide the sufficient magnetic field to the switch.

22. The flip-up helmet mount of claim 21, wherein as the magnet module is rotated in a direction opposite the first direction, such as when an operator of the night vision device performs a lateral or sidewards roll, the magnet moves between the use end of the cavity and the rear chamber, and a retaining surface cooperates with gravity to retain the magnet in close proximity to the magnetically-responsive switch to provide the sufficient magnetic field required to keep the night vision device on.

23. The flip-up helmet mount of claim 18, wherein a damping fluid is enclosed with the magnet in the cavity to dampen the movement of the magnet from one of the use and stowed positions to the other of the positions so as to substantially eliminate noise associated with contact of the magnet against the magnet module.

24. The magnet module of claim 1, wherein the use end of the cavity contains at least one ferrous keeper.

25. The magnet module of claim 1, wherein the range of motion required to move the magnet from the use end to the stowed end is at least about 135°.

26. The magnet module of claim 1, wherein the use end of the cavity is located on a shorter leg of the substantially L-shaped cavity.

* * * * *